T. R. SINCLAIRE.
APPARATUS FOR FILTERING LIQUIDS.
No. 171,055. Patented Dec. 1.
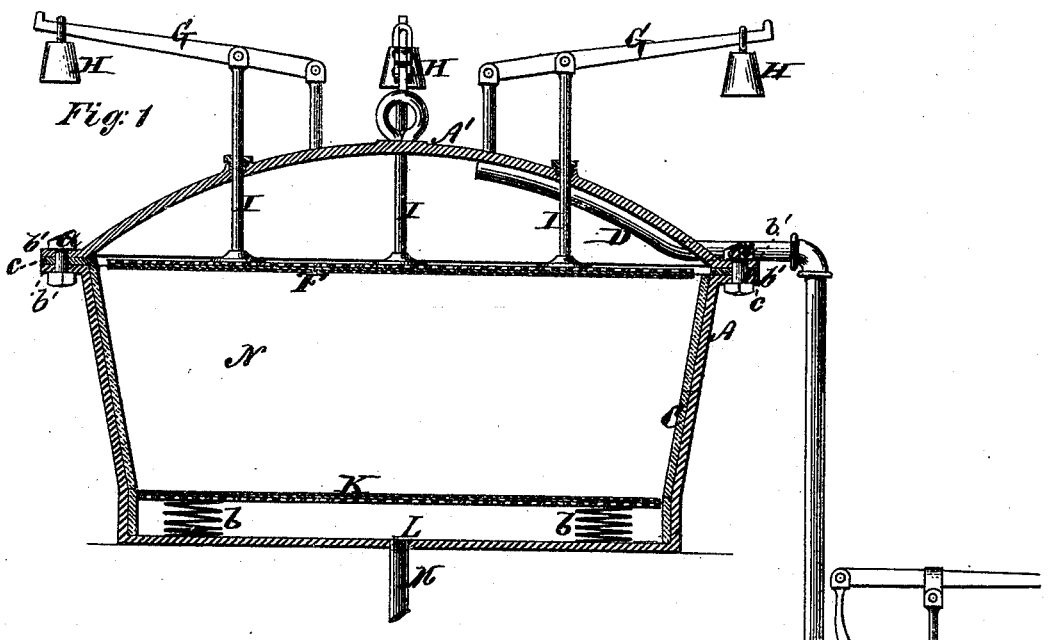
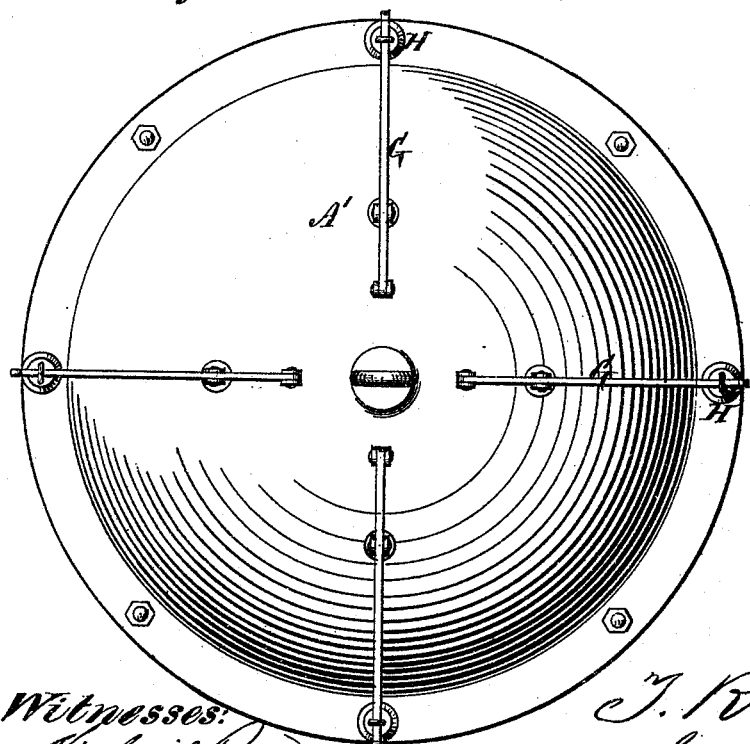
Witnesses:
Michael Ryan
Fred. Haynes
T. R. Sinclaire
by his Attorneys
Brown & Allen

UNITED STATES PATENT OFFICE.

THOMAS R. SINCLAIRE, OF NEW YORK, N. Y., ASSIGNOR TO SINCLAIRE RECTIFYING-MACHINE COMPANY, OF SAME PLACE.

IMPROVEMENT IN APPARATUS FOR FILTERING LIQUIDS.

Specification forming part of Letters Patent No. 171,055, dated December 14, 1875; application filed July 6, 1874.

CASE C.

*To all whom it may concern:*

Be it known that I, THOMAS R. SINCLAIRE, of New York, in the county and State of New York, have invented certain Improvements in Apparatus for Filtering Liquids, of which the following is a specification:

This invention relates to an improved apparatus for the filtration of liquids by means of natural, artificial, or static pressure; the nature of the invention consisting in the combination and arrangement of certain parts, as will be hereinafter fully described.

In the accompanying drawing, Figure 1 is a vertical central section of an apparatus embodying my present invention, and Fig. 2 is a plan or top view of the same.

A designates a tank or vessel, which may be of any suitable shape or form. I have shown a cylindrical vessel, with a tapering or flaring upper portion. A' designates a cover, which is to be applied to the vessel when the filtration is to be effected by artificial pressure, for forcing the liquid downwardly through the filtering material, as, for instance, by a force-pump, B. The said cover may be applied to the vessel A in any suitable manner—say by bolts $a\ a$ passing through flanges $b'\ b'$—and the joint may be packed in any suitable manner, say by india-rubber C interposed between said flanges. I thus produce an air-tight or hermetically-sealed vessel, A A'. C designates an elastic lining, which may be composed of any suitable material with which the inner surfaces of the side or lateral walls of the vessel A may be lined. In the drawing I have shown this lining as composed of india-rubber. Within the said vessel A I arrange a diaphragm or platen, K, composed of some suitable material. In the present instance the diaphragm consists of a perforated plate resting upon springs $b\ b$, which latter also bear upon the bottom of said vessel A, a space, L, intervening between the said diaphragm and the bottom of the said vessel. F designates a diaphragm or follower, composed of any suitable material. In the present instance I have shown a perforated plate similar to the diaphragm or platen K. This diaphragm or follower F is of a size or diameter which will permit of its being forced or pressed down a certain or suitable distance into the vessel A. Either or both of said diaphragms may be faced or covered with wire-gauze, felt, or any other suitable permeable material, when desired. The space within the vessel A between the diaphragms F and K, when both are used, constitute the filtering-chamber N; but when the diaphragm or follower F only is used the space below the said diaphragm F constitutes the filtering-chamber, and when the diaphragm or platen K only is used the space above the said diaphragm or platen K constitutes the filtering-chamber. The said filtering-chamber N is for containing charcoal or other suitable filtering material.

In the apparatus illustrated in the drawing both of the diaphragms F and K are shown as being vertically adjustable, and as being automatically so, by means of the springs $b\ b$ in the case of the diaphragm K, and by means of the standards I, operated by weighted levers G H, in the case of the diaphragm F.

The said vessel is provided at its lower portion with an orifice or pipe, M, which, in the present instance, opens into or communicates with the space L.

When the apparatus is to be used for filtering under pressure a pipe, D, leading from the force-pump B or a reservoir, or from any other apparatus or means for producing pressure, may be employed, which pipe may enter the vessel at any suitable part. I have shown this pipe as entering the vessel A through the cover A'.

I will first explain the operation of the apparatus when used for filtering under pressure downward, and in so doing will specify some of the modifications which may be made in the several parts of the same.

The filtering-chamber N is packed or supplied with the requisite quantity of the material which is to be used as a filtering medium, as, for instance, pulverized charcoal. The diaphragm or follower F and cover A', with appendages, are then applied to the vessel A. The diaphragm or follower F is so arranged as to press upon the filtering material in the chamber N, which, in the example shown, is effected by means of the standards I, and levers and weights G H, though any other suitable means or power may be employed for this purpose. The liquid to be filtered is then introduced, under pressure, through the pipe D, and caused to percolate through the filtering material in the chamber N, and out of the pipe or orifice M. Now, in case the liquid cuts or forms channels between the vessel and filtering material, or between the filtering material and the lining C, when the same is used, and thereby be permitted to escape from the vessel through such channels without being properly filtered, the said channels may be speedily closed or filled up by pressure exerted upon the diaphragm F, and in the example shown in the drawing the said pressure would tend to move the whole mass of filtering material downward, the diaphragm or platen K yielding sufficiently to allow of such operation, and it is obvious that such displacement of the filtering material would fill up all such channels; and I will here remark that if the springs $b\ b$ contain a sufficient volume of power to overcome the inertia of the filtering material after being depressed, upon relieving a portion of the pressure upon the diaphragm or follower F, the position of the filtering material in the chamber N may be changed up and down at will, and, hence, I secure a perpetual provision or means for filling or closing up all such channels.

The lining C, when used, tends to prevent the formation of such channels or grooves, for the reason not only that the liquid is not so liable to form channels between the lining and the filtering material as it is between the sides of the vessel itself and the filtering material, but especially because, being made elastic, the lining, under the operation of packing the filtering material, would become compressed and of a less thickness, and would then, of course, expand toward and against the filtering material, as the same would tend to compact or contract away from such lining. I will further remark that if the vessel A, when provided with the diaphragm K, were arranged over a suitable receptacle for the filtered liquid, the bottom of the vessel A itself could be dispensed with, or the said diaphragm could be dispensed with and the bottom of the vessel be perforated.

It is, of course, obvious that the diaphragm K may be made adjustable by lever mechanism, and that the diaphragm F may be made adjustable by springs, and, also, that either or both of the said diaphragms K and F may be made adjustable by screws—one or more—or by any other suitable means, instead of by the springs or lever mechanism.

Having thus described the method of filtration of liquid under pressure downward through the vessel, I will now describe the operation of the vessel for filtering downward with the cover A' removed—that is, in an open-top vessel. In such case the diaphragm or follower F should be placed sufficiently far down in the vessel to permit of the liquid to be filtered being contained above the said diaphragm or follower, and the liquid would consequently percolate through the filtering material and find its escape at the bottom of the vessel, and the diaphragm or follower F could be made automatically adjustable by means of the standards I and levers and weights G H, and in such case cross-beams or any other suitable contrivance for supporting such mechanism might be adopted.

I will remark that an exhausting apparatus may be applied to the pipe M, the liquid being thus caused to pass through the filtering-chamber by means of its own weight and atmospheric pressure. And I will here remark that the liquid may be filtered under pressure by forcing the liquid by any suitable means through the pipe or orifice M upward through the filtering-chamber and out of the vessel. And I will also remark that the lining C may be so applied as to extend between the flanges $b'\ b'$, thereby performing the functions of the packing $c$, as well as to absolutely prevent the passage or escape of liquid between it and the sides of the vessel, as shown.

What I claim as my invention, and desire to secure by Letters Patent, is—

1. The combination of an elastic lining with a filtering-vessel, substantially as herein specified.

2. The combination of the automatically-adjustable diaphragm K with a filtering-vessel, A, either with or without the air-tight or hermetically sealed or closed cover A', substantially as and for the purposes herein specified.

3. The combination of the automatically-adjustable diaphragm F with an air-tight or hermetically sealed or closed filtering-vessel, A A', substantially as and for the purposes herein specified.

4. The combination of the adjustable diaphragms F and K with a tapering or conical filtering-vessel, A, substantially as and for the purpose herein specified.

5. The combination of the adjustable diaphragms F and K, either or both, with an air-tight or hermetically sealed or closed tapering or conical filtering-vessel, A A', substantially as herein specified.

6. The combination of lever mechanism with a diaphragm and a filtering-vessel, substantially as herein specified.

7. The combination of the following elements: the air-tight or hermetically sealed or closed tapering or conical filtering-vessel A A', the pipes or orifices D and M, (one or more of each,) and the adjustable diaphragms F and K, either or both, substantially as herein specified.

8. The combination of the following elements: a forcing apparatus, B, a filtering-vessel, A, with or without the air-tight or hermetically sealing or closing cover A', and the adjustable diaphragms F and K, either or both, substantially as herein specified.

9. The combination of springs with a diaphragm and a filtering-vessel, substantially as and for the purposes herein set forth.

10. An apparatus for filtering, clarifying, or rectifying liquids, consisting of the following parts: an air-tight or hermetically sealed or closed tapering or conical filtering-vessel, with or without the lining C, an induction and an eduction pipe or orifice, a forcing apparatus, an adjustable diaphragm or follower, F, and an adjustable diaphragm or platen, K, whereby, when filtering under pressure, any channels formed between either the vessel or lining and the filtering material, or in the filtering material itself, may be closed up, substantially as herein set forth.

11. The combination of an adjustable diaphragm, K, with a conical or tapering filtering-vessel, substantially as specified.

THOS. R. SINCLAIRE.

Witnesses:
MICHAEL RYAN,
WM. F. PICKETT.